United States Patent
Choi et al.

(10) Patent No.: US 10,313,950 B2
(45) Date of Patent: Jun. 4, 2019

(54) METHOD AND DEVICE FOR PERFORMING FAST FALLBACK IN ORDER TO AVOID LINK DISCONNECTION IN WIRELESS ACCESS SYSTEM SUPPORTING MILLIMETER WAVE (MMWAVE)

(71) Applicant: LG ELECTRONICS INC., Seoul (KR)

(72) Inventors: Kukheon Choi, Seoul (KR); Jaehoon Chung, Seoul (KR); Genebeck Hahn, Seoul (KR); Eunjong Lee, Seoul (KR); Jinmin Kim, Seoul (KR); Kwangseok Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/329,978

(22) PCT Filed: Sep. 21, 2015

(86) PCT No.: PCT/KR2015/009859
§ 371 (c)(1),
(2) Date: Jan. 27, 2017

(87) PCT Pub. No.: WO2016/043563
PCT Pub. Date: Mar. 24, 2016

(65) Prior Publication Data
US 2017/0272998 A1    Sep. 21, 2017

Related U.S. Application Data

(60) Provisional application No. 62/053,209, filed on Sep. 21, 2014.

(51) Int. Cl.
*H04W 36/00* (2009.01)
*H04W 36/30* (2009.01)
*H04W 76/10* (2018.01)

(52) U.S. Cl.
CPC .......... *H04W 36/30* (2013.01); *H04W 36/00* (2013.01); *H04W 36/0072* (2013.01); *H04W 76/10* (2018.02)

(58) Field of Classification Search
CPC .............................. H04W 36/30; H04W 76/02
See application file for complete search history.

(56) References Cited

U.S. PATENT DOCUMENTS

| | | | | |
|---|---|---|---|---|
| 2008/0182579 A1* | 7/2008 | Wang | ................ | H04W 36/0077 455/436 |
| 2010/0074220 A1* | 3/2010 | Jung | ................ | H04W 36/0055 370/331 |

(Continued)

FOREIGN PATENT DOCUMENTS

| | | |
|---|---|---|
| JP | 2010-288081 A | 12/2010 |
| JP | 2015-500602 A | 1/2015 |

(Continued)

OTHER PUBLICATIONS

Radiocommunication Study Groups, "The technical feasibility of IMT in the bands above 6 GHz," International Telecommunication Union, 18th Meeting of Working Party 5D, Ho Chi Minh City, Viet Nam, Feb. 12-19, 2014, pp. 1-23.

*Primary Examiner* — Mohammad S Anwar
(74) *Attorney, Agent, or Firm* — Birch, Stewart, Kolasch & Birch, LLP

(57) ABSTRACT

The present invention relates to a wireless access system supporting a millimeter wave (mmWave), and provides methods for performing a fast fallback in order to avoid a link disconnection and devices supporting the same. As an embodiment of the present invention, a method for performing a fast fallback by a terminal in a wireless access system supporting a millimeter wave (mmWave) may comprise the steps of: establishing radio resource control (RRC) connections with a mmWave base station and a legacy base station, (Continued)

respectively; receiving downlink data transmitted from the mmWave base station; receiving, from the legacy base station, resource-related information associated with a resource to be allocated for a fast fallback; detecting whether a non-light of sight (NLoS) transition occurs in a mmWave link with the mmWave base station; and when the NLoS transition occurs, transmitting a fallback request message to the legacy base station in order to perform the fast fallback.

8 Claims, 19 Drawing Sheets

(56) References Cited

U.S. PATENT DOCUMENTS

| | | | | |
|---|---|---|---|---|
| 2010/0260142 A1* | 10/2010 | Jung | ................ | H04W 36/0077 370/331 |
| 2011/0044287 A1 | 2/2011 | Park et al. | | |
| 2012/0206299 A1 | 8/2012 | Valdes-Garcia | | |
| 2013/0088983 A1 | 4/2013 | Pragada et al. | | |
| 2013/0237218 A1* | 9/2013 | Li | ................ | H04W 48/16 455/434 |
| 2014/0087731 A1* | 3/2014 | Zhang | ................ | H04W 36/0055 455/436 |
| 2014/0092866 A1* | 4/2014 | Teyeb | ................ | H04W 36/24 370/331 |
| 2014/0307708 A1* | 10/2014 | Son | ................ | H04W 36/0055 370/331 |

FOREIGN PATENT DOCUMENTS

| | | |
|---|---|---|
| JP | 2015-500605 A | 1/2015 |
| KR | 10-2008-0050301 A | 6/2008 |
| KR | 10-2014-0102278 A | 8/2014 |
| WO | WO 2013/086164 A1 | 6/2013 |
| WO | WO 2013/086410 A2 | 6/2013 |

* cited by examiner

FIG. 6
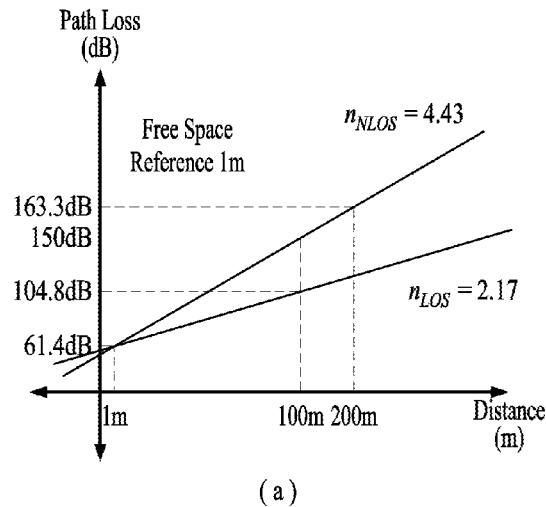
(a)
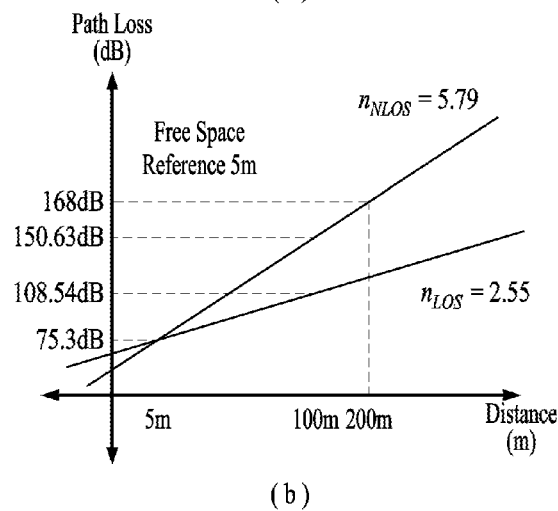
(b)
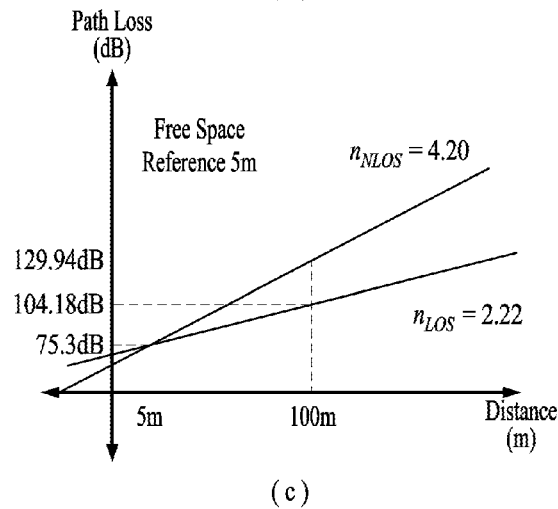
(c)

FIG. 8
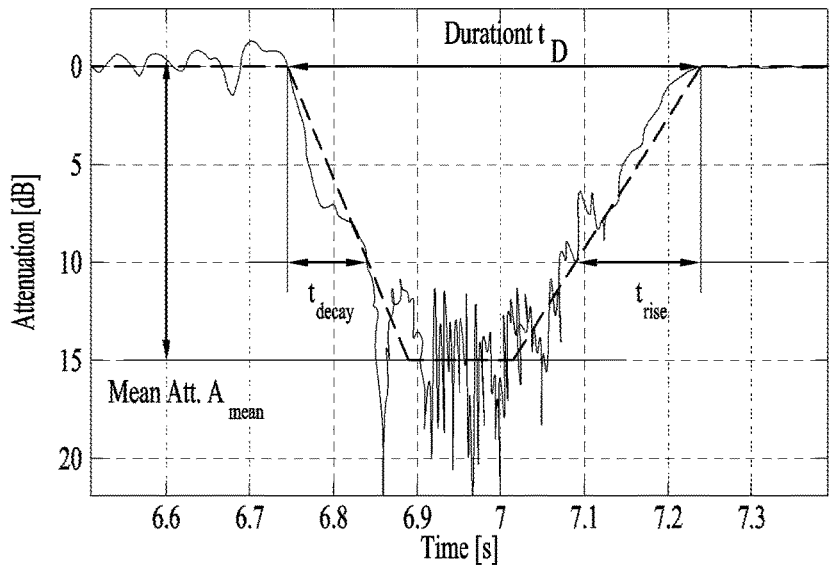
(a)
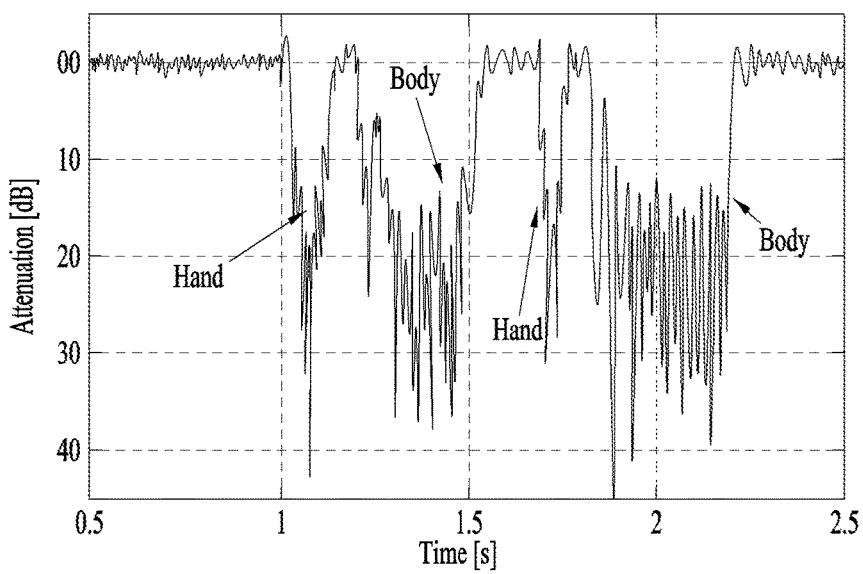
(b)

FIG. 13
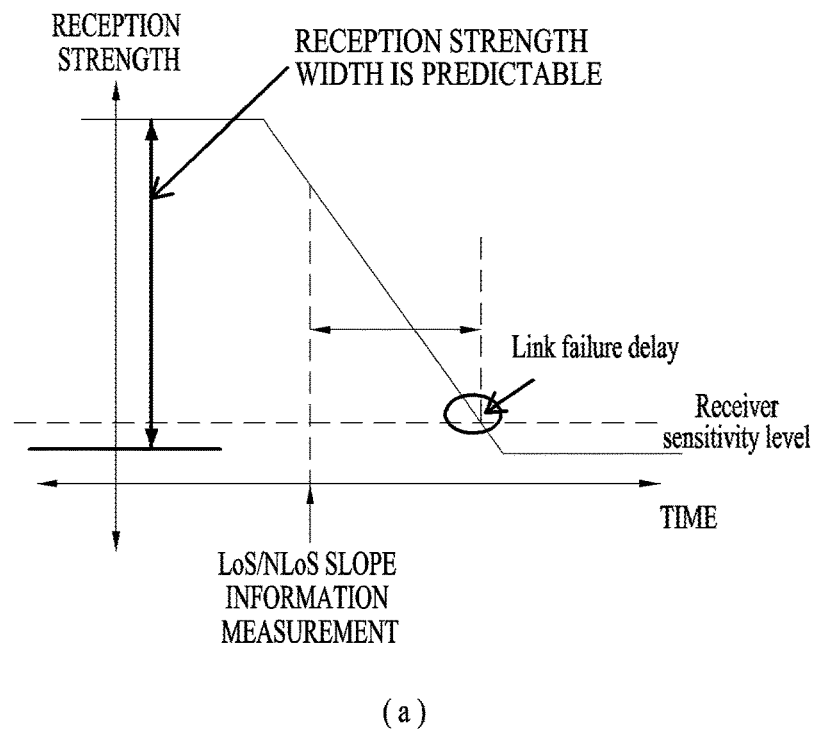
(a)
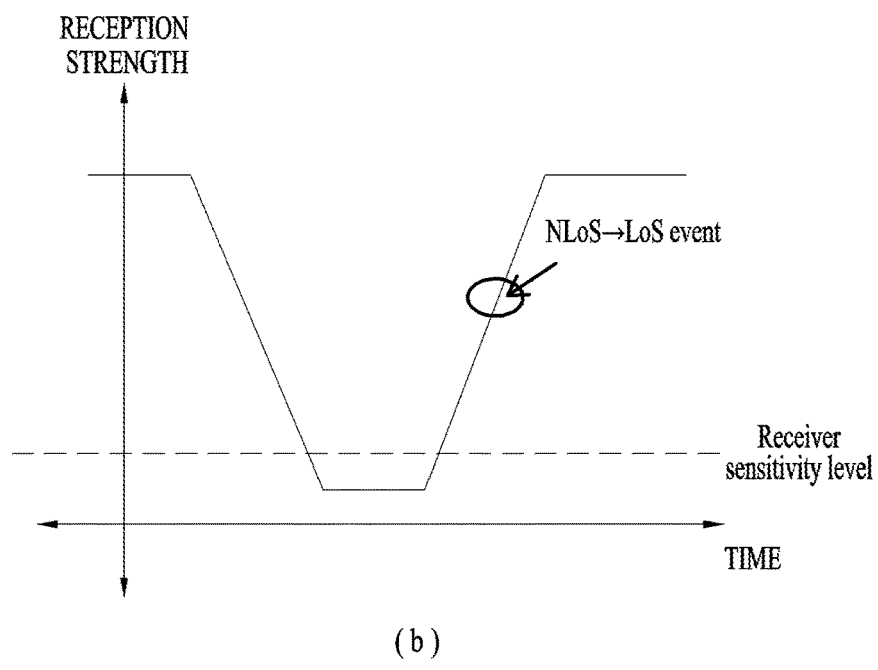
(b)

FIG. 16
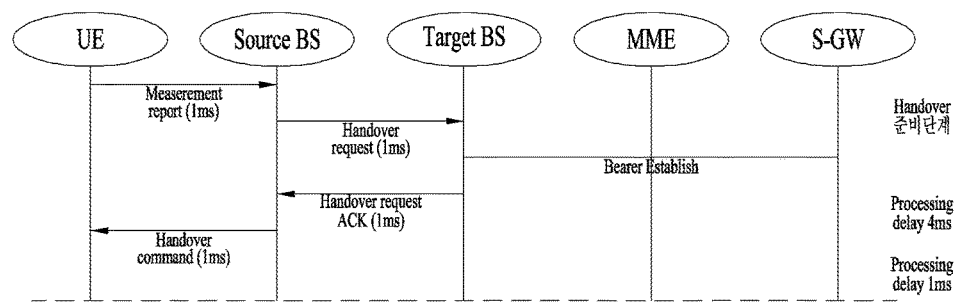
(a)
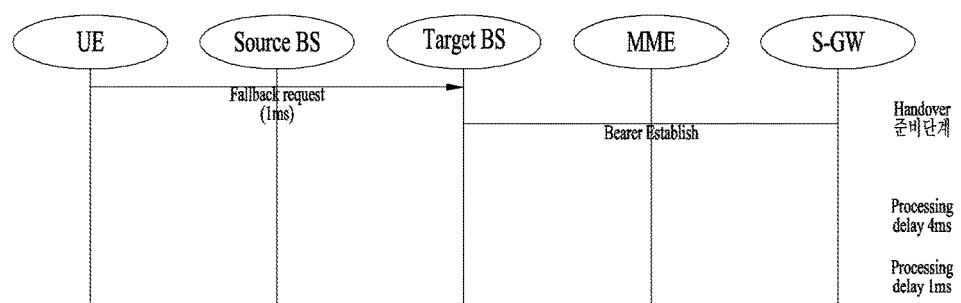
(b)

METHOD AND DEVICE FOR PERFORMING FAST FALLBACK IN ORDER TO AVOID LINK DISCONNECTION IN WIRELESS ACCESS SYSTEM SUPPORTING MILLIMETER WAVE (MMWAVE)

CROSS REFERENCE TO RELATED APPLICATIONS

This application is the National Phase of PCT International Application No. PCT/KR2015/009859, filed on Sep. 21, 2015, which claims priority under 35 U.S.C. 119(e) to U.S. Provisional Application No. 62/053,209, filed on Sep. 21, 2014, all of which are hereby expressly incorporated by reference into the present application.

TECHNICAL FIELD

The present invention relates to a wireless access system supporting millimeter wave (mmWave) and, more particularly, to methods of performing fast fallback in order to avoid link failure and apparatuses supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention is to support efficient data communication in an mmWave system.

Another object of the present invention is to provide methods of performing a fast link recovery process before link failure occurs due to LoS/NLoS transition in an mmWave system.

Another object of the present invention is to provide a method of reducing a fallback time to be suitable for an mmWave system as compared to a legacy system.

Another object of the present invention is to provide an apparatus supporting such methods.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention relates to a wireless access system supporting millimeter wave (mmWave) and provides methods of performing fast fallback in order to avoid link failure and apparatuses supporting the same.

The object of the present invention can be achieved by providing a method of performing fast fallback at a user equipment (UE) in a wireless access system supporting millimeter wave (mmWave) including establishing a radio resource control (RRC) connection with an mmWave base station (BS) and a legacy BS, receiving downlink data from the mmWave BS, receiving resource related information related to resources to be allocated for fast fallback from the legacy BS, detecting whether non-light of sight (NLoS) transition occurs in an mmWave link with the mmWave BS, and transmitting a fallback request message in order to perform fast fallback to the legacy BS when NLoS transition occurs.

In another aspect of the present invention, provided herein is a user equipment (UE) for performing fast fallback in a wireless access system supporting millimeter wave (mmWave) including a transmission unit, a reception unit, and a processor functionally connected to the transmission unit and the reception unit to support fast fallback, wherein the processor is configured to establish a radio resource control (RRC) connection with an mmWave base station (BS) and a legacy BS, receive downlink data from the mmWave BS through the reception unit, receive resource related information related to resources to be allocated for fast fallback from the legacy BS through the reception unit, detect whether non-light of sight (NLoS) transition occurs in an mmWave link with the mmWave BS, and transmit a fallback request message through the transmission unit in order to perform fast fallback to the legacy BS when NLoS transition occurs.

The resource related information may include a temporary cell identifier and downlink transmit power strength information of the legacy BS. At this time, the resource related information may further include resource allocation information for allocating a resource region in which the fallback request message is transmitted.

The fallback request message may include sequence number (SN) status transfer information, UE-aggregate maximum bit rate (AMBR) information, UE security capability information and an access stratum (AS) security base key for the legacy BS.

The method may further include receiving downlink data from the legacy BS after performing fallback to the legacy BS, and the UE continuously may maintain the RRC connection with the mmWave BS even after fallback to the legacy BS.

It is to be understood that both the foregoing general description and the following detailed description of the present invention are exemplary and explanatory and are intended to provide further explanation of the invention as claimed.

Advantageous Effects

The embodiments of the present invention have the following effects.

First, it is possible to continuously transmit downlink data to a UE without link failure even when an LoS state transitions to an NLoS state.

Second, an mmWave UE can perform faster fallback than legacy fallback to avoid link failure.

Third, it is possible to perform a fast link recovery process before link failure occurs due to LoS/NLoS transition in an mmWave system.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

DESCRIPTION OF DRAWINGS

The accompanying drawings, which are included to provide a further understanding of the invention, illustrate embodiments of the invention and together with the description serve to explain the principle of the invention.

FIG. 6 is a diagram showing a linear modeling result of path loss according to distance.

FIG. 8 is a diagram illustrating a case in which an mmWave signal is attenuated by a human body.

FIG. 13 is a diagram illustrating a method of, at a UE, estimating a state in an LoS environment transitions to an NLoS environment, that is, a state in which NLoS occurs.

FIG. 16 is a diagram illustrating a method of performing one fallback preparation phases instead of four fallback preparation phases of a legacy system.

BEST MODE

Figure 1:
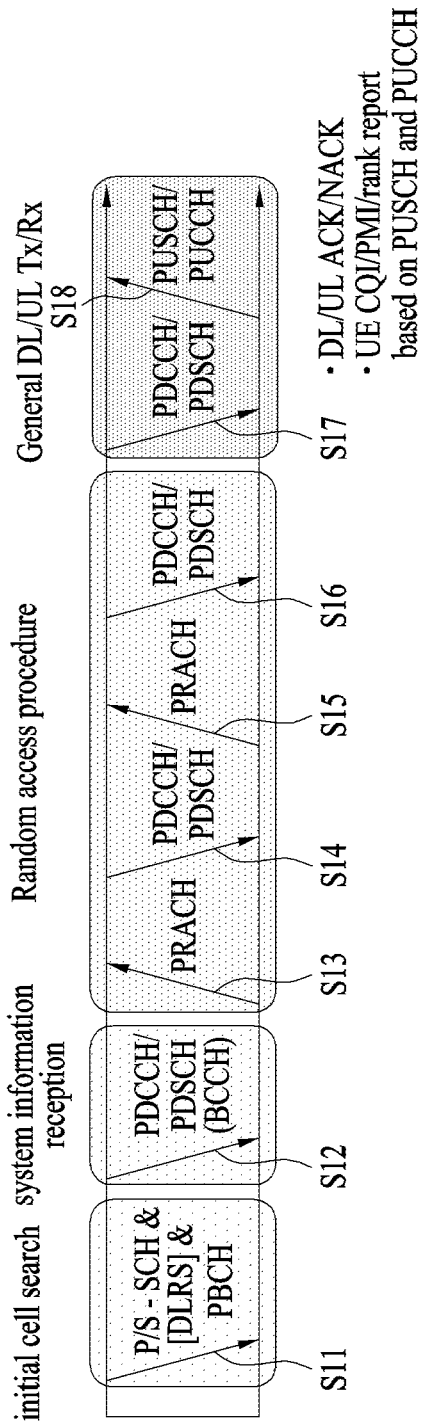
FIG. 1 is a conceptual diagram illustrating physical channels used in the embodiments and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present invention (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term used in embodiments of the present disclosure, a data block is interchangeable with a transport block in the same meaning. In addition, the MCS/TBS index table used in the LTE/LTE-A system can be defined as a first table or a legacy table, and the MCS/TBS index table which is used for supporting the 256QAM can be defined as a second table or a new table.

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A system

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 system overview

FIG. 1 illustrates physical channels and a general method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
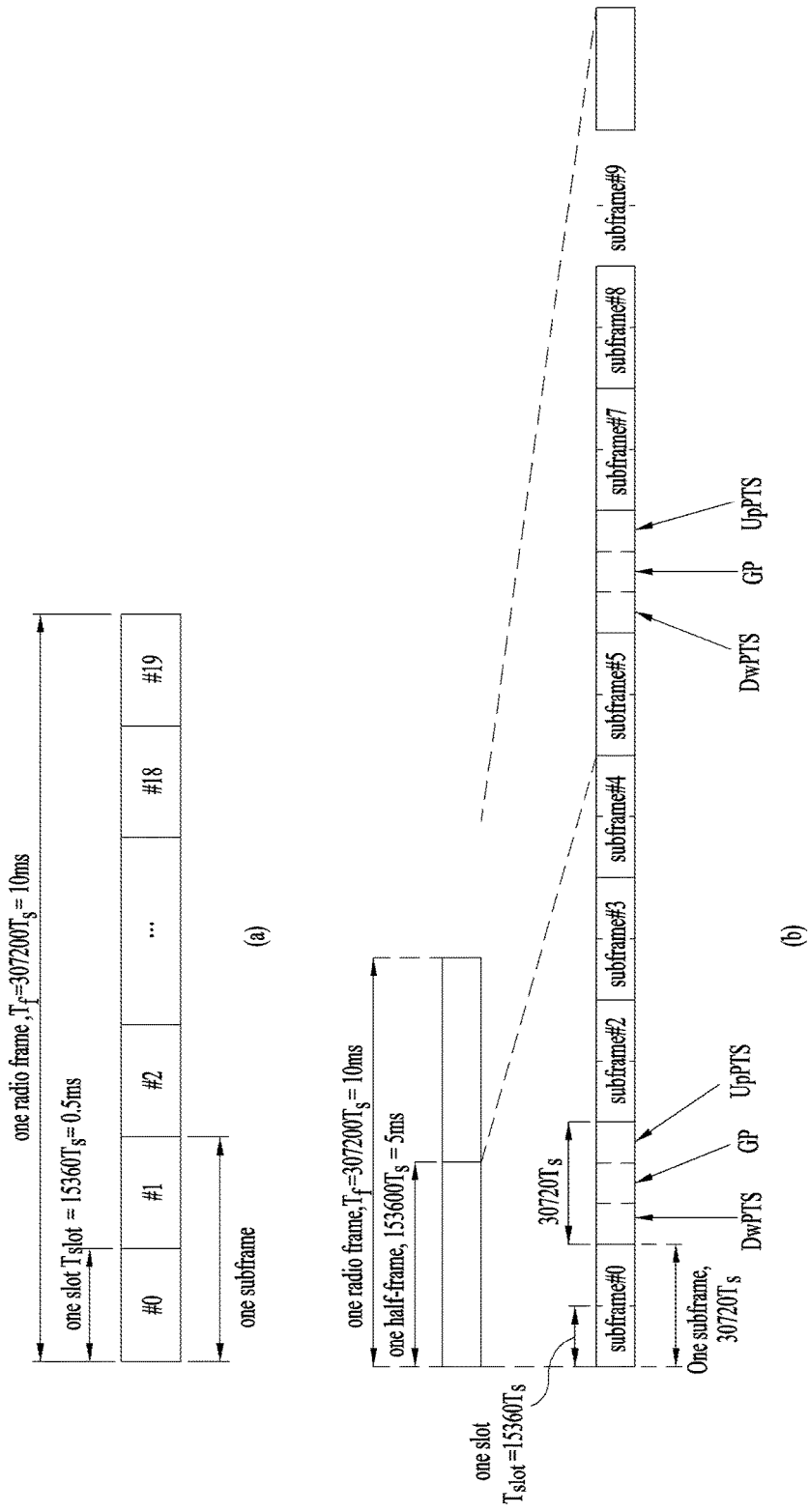
FIG. 2 is a diagram illustrating a structure of a radio frame for use in the embodiments.

FIG. 2 illustrates exemplary radio frame structures used in embodiments of the present disclosure.

FIG. 2($a$) illustrates frame structure type 1. Frame structure type 1 is applicable to both a full Frequency Division Duplex (FDD) system and a half FDD system.

One radio frame is 10 ms ($Tf=307200 \cdot Ts$) long, including equal-sized 20 slots indexed from c0 to 19. Each slot is 0.5 ms ($Tslot=15360 \cdot Ts$) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as $Ts=1/(15 \text{ kHz} \times 2048)=3.2552 \times 10-8$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
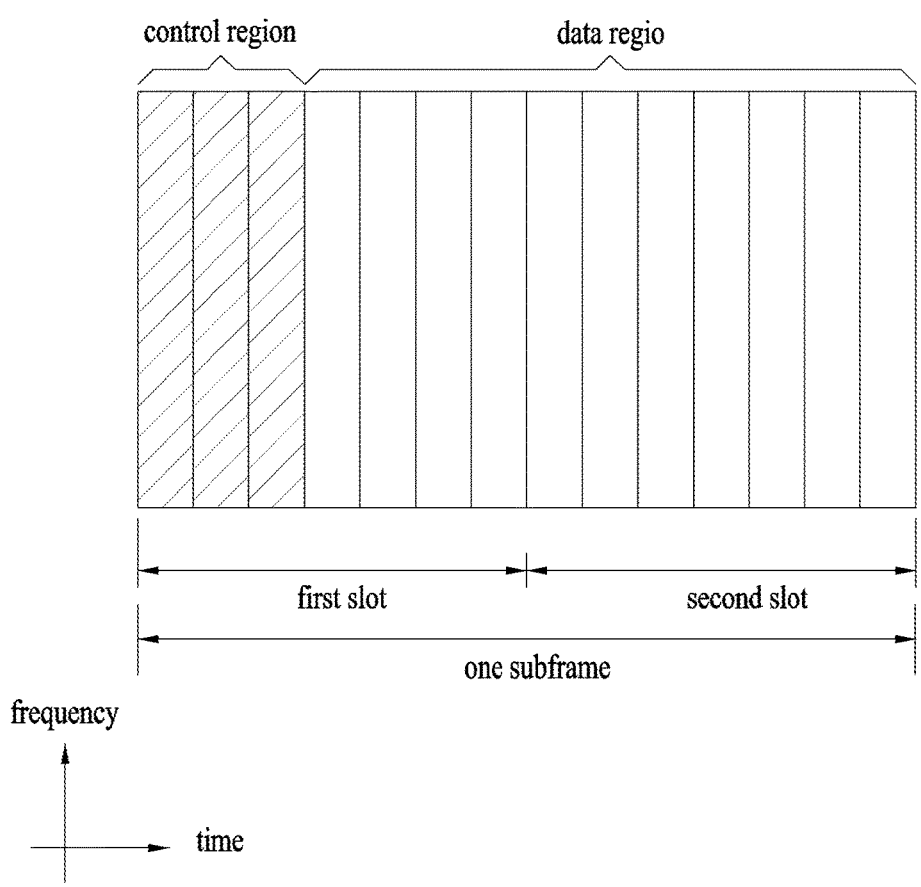
FIG. 5 is a diagram illustrating a structure of a downlink subframe according to the embodiments.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Physical Downlink Control Channel (PDCCH)

1.2.1 PDCCH overview

The PDCCH may deliver information about resource allocation and a transport format for a Downlink Shared

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
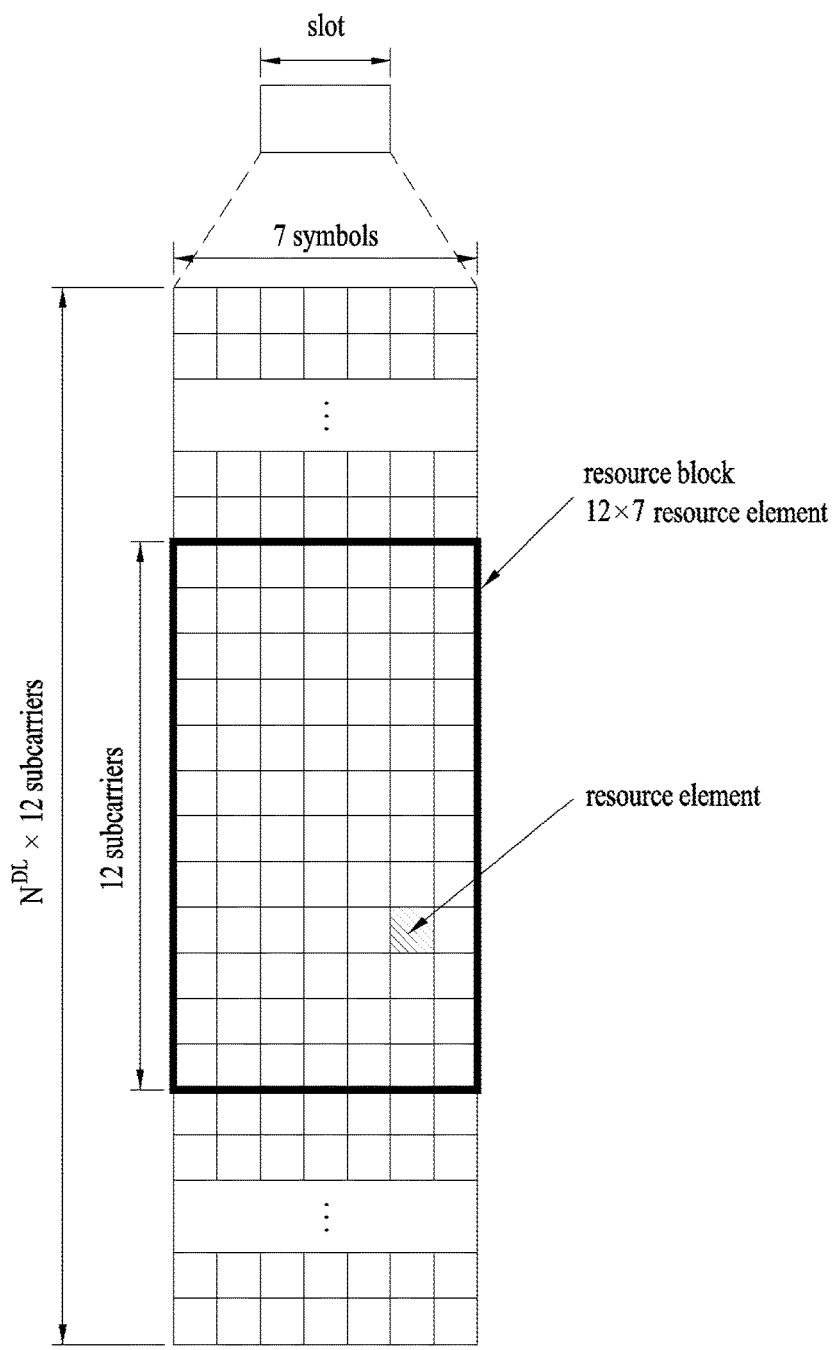
FIG. 3 is a diagram illustrating an example of a resource grid of a downlink slot according to the embodiments.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
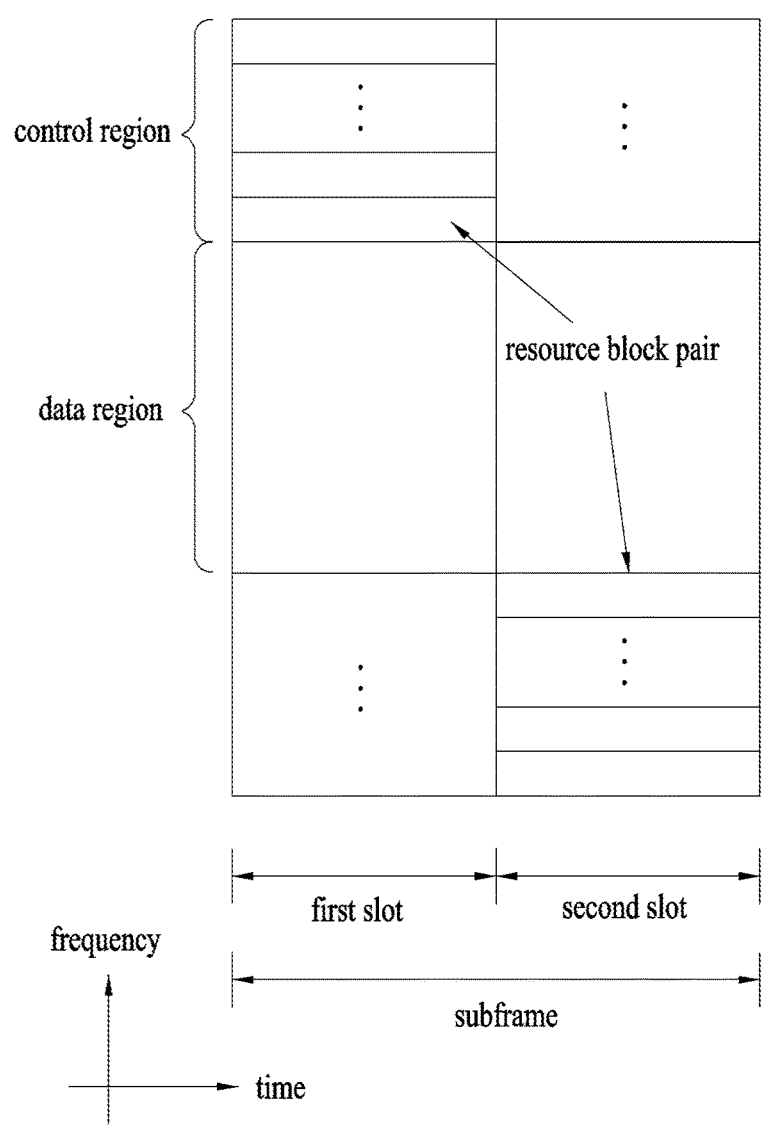
FIG. 4 is a diagram illustrating a structure of an uplink subframe according to the embodiments.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by NREG. Then the number of CCEs available to the system is NCCE ($=\lfloor N_{REG}/9 \rfloor$) and the CCEs are indexed from 0 to NCCE-1.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCE (n) | Number of REG | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for PUSCH transmissions (uplink) |
| Format 1 | Resource assignments for single codeword PDSCH transmission (transmission modes 1, 2 and 7) |

TABLE 3-continued

| DCI Format | Description |
|---|---|
| Format 1A | Compact signaling of resource assignments for sigle codeword PDSCH (all modes) |
| Format 1B | Compact resource assignments for PDSCH using rank-1 closed loop precoding (mode 6) |
| Format 1C | Very compact resource assignments for PDSCH (e.g., paging/broadcast system information) |
| Format 1D | Compact resource assignments for PDSCH using multi-user MIMO(mode 5) |
| Format 2 | Resource assignments for PDSCH for closed loop MIMO operation (mode 4) |
| Format 2A | resource assignments for PDSCH for open loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;
(3) Transmission mode 3: Open-loop spatial multiplexing when the number of layer is larger than 1 or Transmit diversity when the rank is 1;

(4) Transmission mode 4: Closed-loop spatial multiplexing;

(5) Transmission mode 5: MU-MIMO;

(6) Transmission mode 6: Closed-loop rank-1 precoding;

(7) Transmission mode 7: Precoding supporting a single layer transmission, which is not based on a codebook (Rel-8);

(8) Transmission mode 8: Precoding supporting up to two layers, which are not based on a codebook (Rel-9);

(9) Transmission mode 9: Precoding supporting up to eight layers, which are not based on a codebook (Rel-10); and

(10) Transmission mode 10: Precoding supporting up to eight layers, which are not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then, the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE $N_{CCE,k-1}$. $N_{CCE,k}$ is the total number of CCEs in the control region of a kth subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH Format | Number of CCE (n) | Number of candidates in CSS | Number of candidates in USS |
| --- | --- | --- | --- |
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1,2,4,8\}$. The CCEs of PDCCH candidate set m in the SS may be determined by the following equation.

$$L \cdot \{(Y_k+m) \bmod \lfloor N_{CCE,k}/L \rfloor\}+i \qquad \text{[Equation 1]}$$

where $M^{(L)}$ is the number of PDCCH candidates with CCE aggregation level L to be monitored in the SS, m=0, ..., $M^{(L)}$−1, i is the index of a CCE in each PDCCH candidate, and i=0, ..., L−1. k=⌊$n_s$/2⌋ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k=(A \cdot Y_{k-1}) \bmod D \qquad \text{[Equation 2]}$$

where $Y_{-1}=n_{RNTI} \neq 0$, $n_{RNTI}$ indicating an RNTI value. A=39827 and D=65537.

2. Millimeter wave (mmWave)

2.1 Power width difference between line of sight (LoS) and non line of sight (NLoS)

FIG. 6 is a diagram showing a linear modeling result of path loss according to distance.

FIGS. 6(a) to 6(c) show linear modeling results measured in different areas, in which different propagation loss constants are obtained at 28 GHz.

In FIG. 6(a), assume that path losses of an LoS channel and an NLoS channel are respectively 104.8 dB and 150 dB in consideration of reflection loss, rotation loss, penetration loss, etc. in a state in which a distance between a transmitter and a receiver is 100 m and propagation loss constants of LoS and NLoS upon applying a linear filtering scheme are 2.17 and 4.43 in consideration of a reference path loss offset of 61.4 dB at a distance of 1 m at 28 GHz.

FIGS. 6(b) and 6(c) are equal to FIG. 6(a) except for considering a reference path loss offset at a distance of 5 m. For example, in FIG. 6(c), a distance between buildings is about 30 m, three to four campus buildings are present, and the density of such buildings may belong to a suburban class in terms of a path loss environment. In contrast, the path loss model of FIG. 6(a) is based on the simulation result using a ray tracing method for a Manhattan street lattice model and is similar to the path loss model of FIG. 6(b) in terms of calculation of the path loss value at the distance of 100 m or less.

That is, the NLoS propagation loss constants of FIG. 6(a) and FIG. 6(b) are respectively 4.43 and 5.76 and thus are different from each other. However, since a reference distance is set to 1 m in FIG. 6(a) and is set to 5 m in FIG. 6(b), the results of path loss calculation within 100 m are similar to that of FIG. 6(c).

Based on this, in the embodiments of the present invention, the LoS/NLos path loss model of the urban outdoor environment for 28-GHz mmWave transmission is applied as a path loss model. Based on this modeling result, in the NLoS channel environment for 28-GHz mmWave transmission, a loss difference of 45.2 dB occurs at a distance of 100 m in terms of path loss as compared to the LoS channel environment.

By applying a value of a parameter of a propagation loss constant n derived through the above-described path loss modeling results, a path loss value at an arbitrary distance may be derived as shown in Equation 3 below.

$$PL(d) = PL_{free}(d_0) + 10n\log\left(\frac{d}{d_0}\right) \qquad \text{[Equation 3]}$$

In Equation 3, PL( ) denotes a path loss function, d denotes a distance between a transmitter and a receiver, and $d_0$ denotes a reference distance.

2.2 Characteristics of LoS (Line of Sight) and NLoS (Non Line of Sight)

An mmWave signal is significantly sensitive to shadowing. For instance, in the case of the mmWave signal, 40 dB to 80 dB of signal attenuation may occur due to obstacles such as a wall and the like. Moreover, a human body may easily cause 20 dB to 35 dB of signal attenuation. In this case, the obstacles including the human body may cause a propagation delay, which significantly affects transmission of the mmWave signal.

Figure 7:
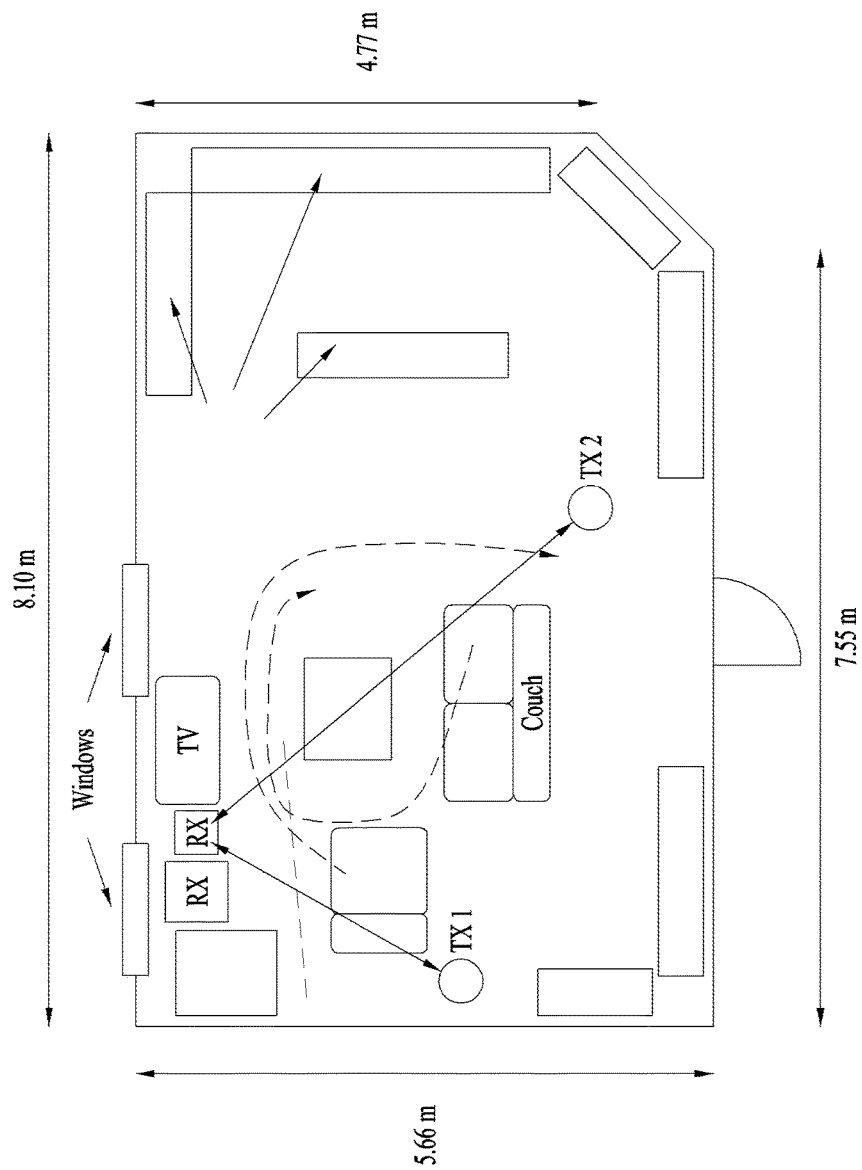
FIG. 7 is a diagram illustrating a case in which an mmWave signal is transmitted indoors and FIG.

FIG. 7 is a diagram illustrating a case in which an mmWave signal is transmitted indoors and FIG. 8 is a diagram illustrating a case in which an mmWave signal is attenuated by a human body.

It is assumed that a normal person runs at a speed of about 14.4 km/h and walks at a speed of about 4.8 km/h, and a sprinter runs at an average speed of about 10 m/s. If a propagation attenuation of the mmWave signal in the indoor environment shown in FIG. 7 is measured based on the assumption, the result shown in FIG. 8 can be obtained. The following measurement parameters are used to measure the propagation attenuation of the mmWave signal.

(1) Agilent E8361A vector network analyzer
(2) Vertical polarized circular horn antennas: 20 dBi
(3) Half beamwidth: 10 degree FIG. 8 (a) shows a result of measuring the mmWave signal in a LoS environment without any obstacles and FIG. 8 (b) shows a result of measuring the mmWave signal in an NLoS environment in which the propagation attenuation due to the human body exists. Referring to FIG. 8, a difference between the LoS/NLoS environments amounts to about 15 dB within a distance of 5 m. In the case of 28 GHz band, a power loss difference between the LoS/NLoS amounts to about 43 dB within a distance of 100 m.

Referring to FIGS. 7 and 8, a transition time from the LoS to the NLoS (LoS/NLoS) caused by a person moving at a speed of 0.6 m/s is about 150 ms. Thus, change in the LoS/NLoS transition time due to an object moving at a speed of 10 m/s can be represented as about $$\frac{0.6 \times 0.15}{10} = 9 \text{ ms.}$$

Such transition time change could be shorter if the person suddenly swings a hand or in other particular cases. That is, since such a transition time interval in the LoS/NLoS environment is caused by movement of a user equipment and change in an environment, it is extremely difficult to expect LoS/NLoS change.

Figure 9:
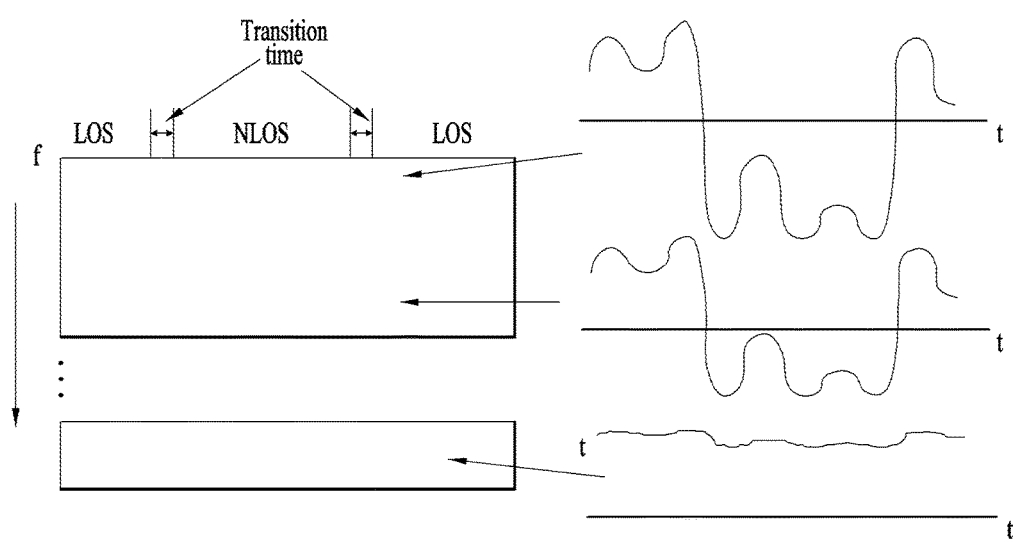
FIG. 9 is a diagram showing a relationship between change in LoS/NLoS transition time according to frequency and receive power.

FIG. 9 is a diagram illustrating a relation between a LoS/NLoS transition time and a reception power depending on frequency. In FIG. 9, the horizontal axis indicates a time domain and the vertical axis indicates a frequency domain.

Referring to FIG. 9, the transition time from the LoS and the NLoS is significantly changed in a high frequency environment whereas the rate of change is decreased in a low frequency environment. However, a power difference between the LoS/NLoS may be decreased in the low frequency environment.

As shown in FIG. 9, when the state is transitioned from the LoS to the NLoS or from the NLoS to the LoS, power attenuation or increased time may depend on how the state is changed from the LoS to the NLoS. When the LoS/NLoS transition is performed, attenuation of a reception signal is increased in the high frequency domain whereas in the low frequency domain, the attenuation is small or does not occur. However, an instantaneous power reduction slope at a certain time t is similar in adjacent bands.

As described above, the mmWave system is highly likely to operate in ultra-high frequency bands. That is, the LoS/NLoS transition in the mmWave signal is extremely sensitive to change in a external environment.

Figure 10:
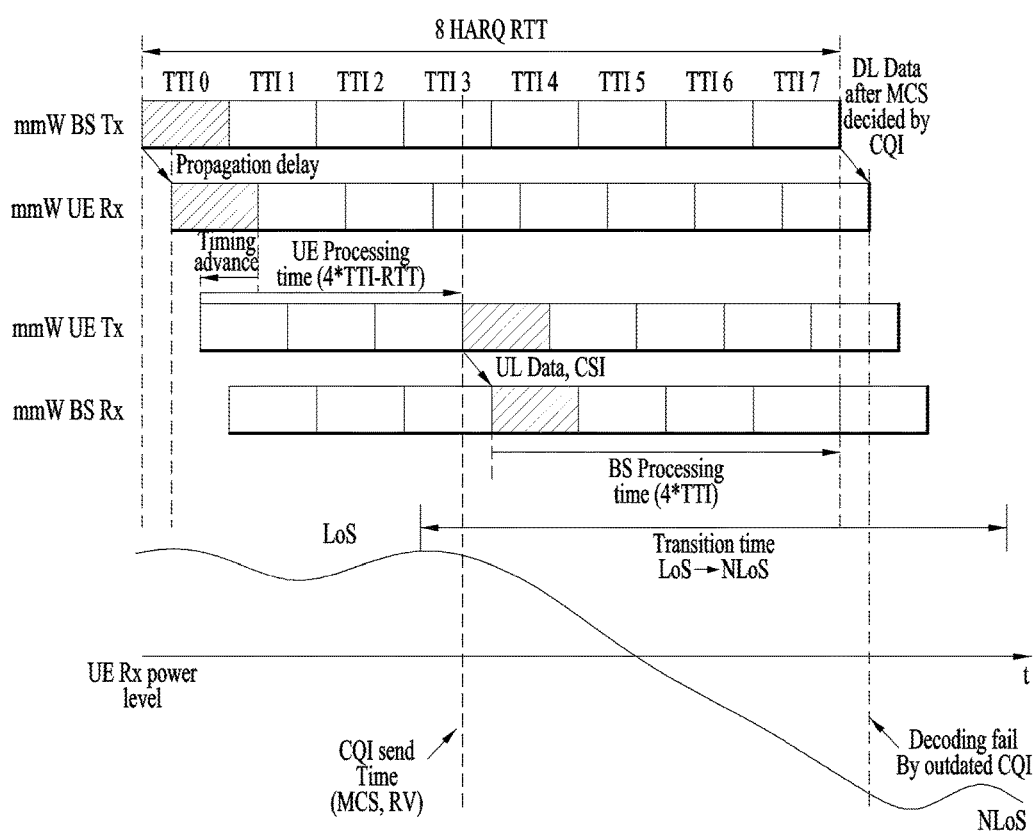
FIG. 10 is a diagram illustrating failure in signal detection due to mmWave downlink reception signal change when the signal detection is performed based on conventional CQI feedback.

FIG. 10 is a diagram illustrating failure in signal detection due to mmWave downlink reception signal change when the signal detection is performed based on conventional CQI feedback.

FIG. 10 shows processes for decoding channel information obtained from a CQI through an 8 HARQ procedure and determining information such as a DCI format, an MCS (modulation and coding scheme), an RV (redundancy version), etc. based on the decoded channel information. In FIG. 10, it is shown that the CQI is outdated if the transition time from the LoS to the NLoS occurs in an mmWave link.

In case that a downlink transmission start time is assumed to be about 4 TTI (4 ms in the LTE), if the LoS/NLoS transition occurs, the most recently detected CQI information of the legacy system is highly likely to have inaccurate information on the transition from the LoS to the NLoS due to the mmWave characteristics. As a result, a base station may transmit inaccurate scheduling information including the MCS and RV to a user equipment and thus the user equipment is highly likely to fail to detect a signal. Consequently, it may cause throughput performance degradation of the system.

As the simplest method for handling channel variation in mmWave downlink, a UE may be configured to transmit the CQI feedback more frequently. The smallest CQI-reporting period of the FDD-based LTE system is composed of two subframes. However, in terms of cost efficiency, decoding of the CQI received at the base station may work as the burden (because a rapid processing time is required). Moreover, if the LoS/NLoS transition occurs while the base station receives and decodes new CQI feedback, even the received new CQI is outdated. Furthermore, since the CQI is an indicator for feeding information based on SINR (signal-to-noise-plus-interference ratio) back, the CQI received at the base station includes information on interference to a received signal as well.

Thus, to identify the LoS/NLoS transition, the user equipment and/or base station are preferred to determine it according to measurement based on a reception power at the corresponding time. As a method of transmitting channel information based on the reception power, a user equipment may measure an RSRP of a downlink reference signal and then report (provide) feedback of the measured RSRP. However, the RSRP is generally suitable for channel measurement performed during a long term because a maximum acceptable time required for the UE to measure the RSRP is 200 ms. In addition, 200 ms is too long from the perspective of the mmWave system. That is, considering that the LoS/NLoS transition needs to be determined based on channel measurement performed during a short term, it is difficult to detect the LoS/NLoS transition and adjust a resultant MCS by using the conventional channel state reporting method.

2.3 mmWave LoS and NLoS transition and receive power scenario

Figure 11:
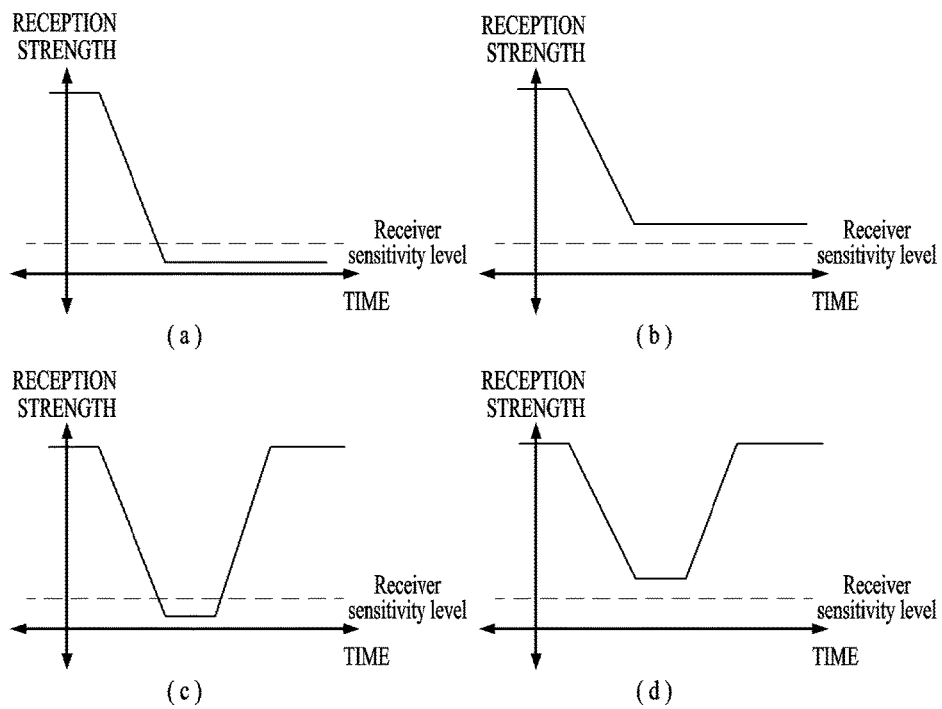
FIG. 11 is a diagram showing receive power scenarios illustrating influence of mmWave LoS/NLoS transition on a link environment.

FIG. 11 is a diagram showing receive power scenarios illustrating influence of mmWave LoS/NLoS transition on a link environment.

In FIG. 11, the vertical axis represents a receive power strength and the horizontal axis represents a time. A minimum value of receive power (that is, a receiver sensitivity level (RSL)) means a minimum receive power value, at which a receiver may receive data. That is, the receiver may normally receive data having an RSL or more even when transitioning to an NLoS state.

Based on such an assumption, referring to FIG. 11(a), the receive power of the NLoS state is lower than the RSL and an NLoS duration is long. In FIG. 11(b), the receive power of the NLoS state is higher than the RSL and the NLoS duration is long. In FIG. 11(c), the receive power of the NLoS state is lower than the RSL and the NLoS duration is short. In FIG. 11(d), the receive power of the NLoS state is higher than the RSL and the NLoS duration is short.

Figure 12:
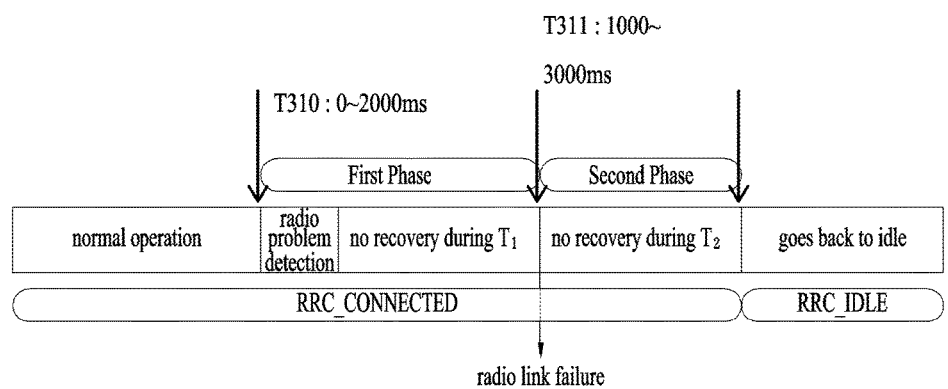
FIG. 12 is a diagram showing an example of a radio link failure process.

In order for a receiver to efficiently perform fallback, an mmWave fallback method may be differently considered according to scenarios shown in FIG. 11. For example, in the receive power scenario of 11(a), receive power decreases to be less than the RSL and the NLoS state is continuously maintained. Accordingly, when a link fails, a receiver rapidly should a radio link failure procedure. At this time, as shown in FIG. 12, as in a legacy radio link failure process, if the link of the receiver fails even after performing two link recovery phases, the receiver enters an idle state. At this time, since a time of at least 1000 ms is required to perform the two link recovery phases, when the link continuously fails, a reception amount is rapidly reduced. Accordingly, in FIG. 11(a), fallback may be rapidly performed before the link fails.

FIG. 12 is a diagram showing an example of a radio link failure process. Referring to FIG. 12, a receiver may sense a problem occurring in a radio link during normal operation. At this time, the receiver performs a link recovery phase as a first phase. At this time, a recovery timer T310 operates and a time of 0 to 2000 ms may be consumed. If the link is not recovered while the timer T310 operates, the receiver performs a second phase and operates a recovery timer T311. The timer may be set to 1000 ms. When the link is recovered while the timers T310 and T311 operate, the receiver performs communication with a transmitter again. When the link is not recovered even during a second phase, the receiver enters an idle state. For a detailed description of FIG. 12, refer to 3GPP TS 36.300.

Referring to FIG. 11 again, in FIGS. 11(b) and 11(d), although the receiver performs a legacy fallback procedure (in the embodiments of the present invention, assume that the fallback procedure is similar to handover), since the receiver is continuously linked to the transmitter, no problem occurs.

However, in the scenario shown in FIG. 11 (c), since a time from triggering of fallback to completion of fallback by the receiver is shorter than a time from when LoS/NLoS transition is measured to when returning to LoS, it is advantageous that fallback is performed in consideration of the scenario. However, otherwise (if the NLoS period is shorter), it is advantageous that fallback is not performed from the viewpoint of data throughput of the receiver. Accordingly, in order for the receiver to appropriately perform fallback, the receiver may estimate and predict the receive power scenario.

2.4 Receive power scenario estimation according to mmWave LoS and NLoS transition In order to distinguish between FIG. 11(a) and FIG. 11(b) when LoS transitions to NLoS, it is important for a receiver (e.g., UE) to predict and estimate a link failure time.

FIG. 13 a diagram illustrating a method of, at a UE, estimating a state in an LoS environment transitions to an NLoS environment, that is, a state in which NLoS occurs.

As shown in FIG. 13(a), the UE may estimate transition from LoS to NLoS when link failure occurs. As shown in FIG. 13(a), the UE may estimate mmWave LoS/NLoS slope information upon LoS/NLoS transition (refer to Application No. PCT/KR2015/006716), measure a distance between the UE and an mmWave BS using a pilot in the LoS state, and estimate reception strength widths in the LoS and NLoS states, thereby estimating a time when link failure occurs.

In addition, with respect to the scenario of FIG. 11(c), the UE may predict and estimate returning from the NLOS state to the LoS state as shown in FIG. 13(b), because whether fallback triggering is performed is determined depending on how long NLoS power is lower than the RSL.

As shown in FIG. 13(b), a period of time of transition of LoS->NLoS->LoS sensitively affects a unique motion pattern of an mmWave UE. Accordingly, the UE should stochastically and empirically estimate transition to NLoS through the motion pattern information of the UE. Accordingly, when the UE stochastically estimates transition to NLoS, errors may occur.

Accordingly, in the below-described embodiments of the present invention, fallback methods of a scenario in which link failure occurs and a scenario in which link failure does not occur among the receive power scenario without considering a scenario in which returning from NLoS to LoS are proposed.

2.5 Legacy fallback procedure

Figure 14:
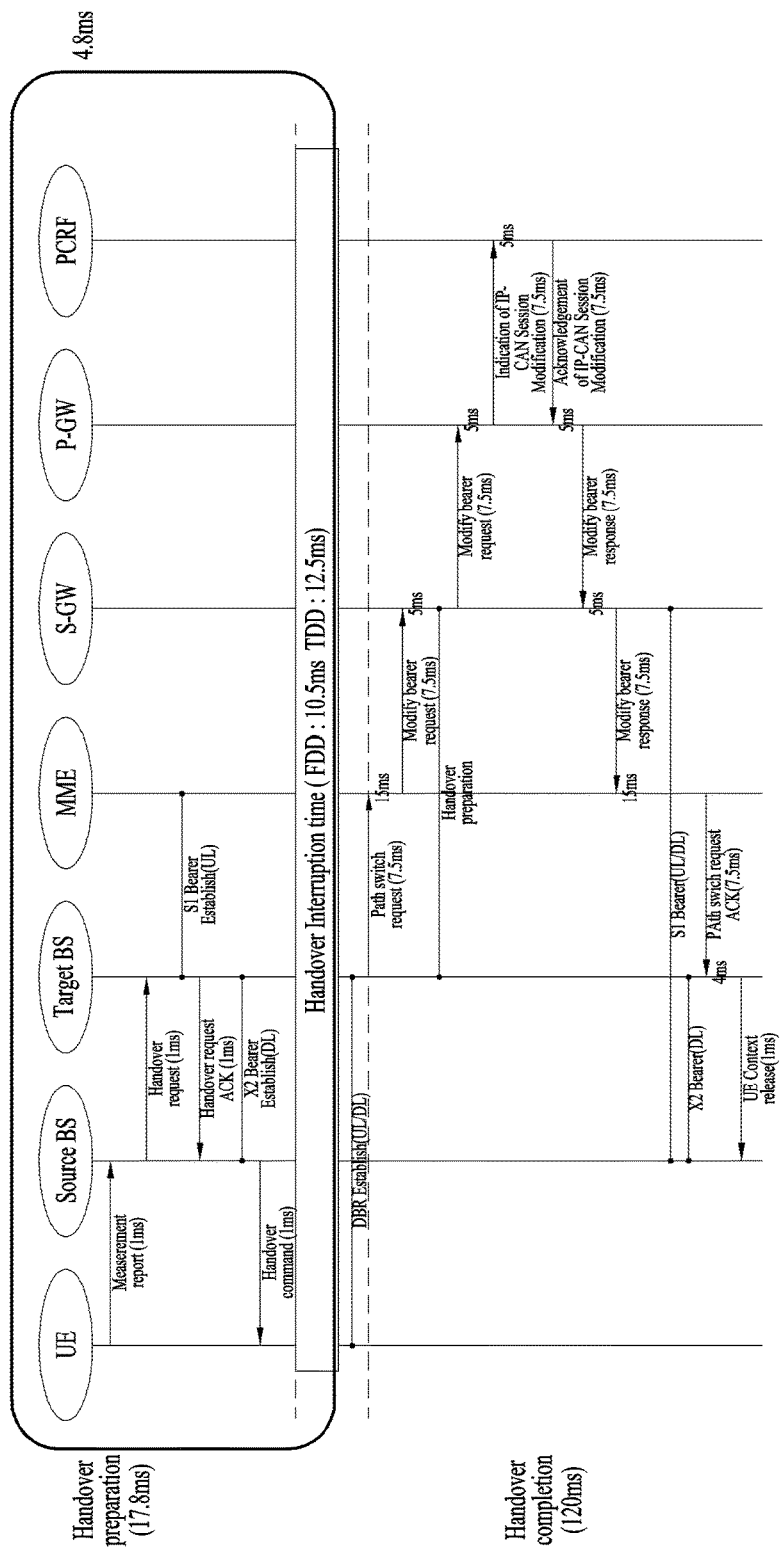
FIG. 14 is a diagram illustrating a legacy handover procedure.

FIG. 14 is a diagram illustrating a legacy handover procedure.

As described with reference to FIG. 11(a), it is most important for a receiver to rapidly perform fallback after LoS/NLoS transition measurement before link failure, in order to prevent transfer rate loss. In the case of FIG. 11(a), the legacy fallback method is equal to a handover procedure. Accordingly, time delay from start of a legacy handover procedure to end of the legacy handover procedure is obtained and compared with an LoS/NLoS transition time, such that the receiver determines whether the legacy fallback method is capable of being performed after NLoS transition measurement before link failure occurs.

In FIG. 14, legacy handover latency is generally calculated. A time required for each phase is as follows.

(1) A handover preparation phase requires a time of about 17.8 ms, (2) a handover execution phase requires a time of about 10.5 ms, and (3) a handover completion phase requires a time of about 120 ms. Accordingly, it may be estimated that total handover latency is about 148.3 ms.

After the handover preparation phase, the receiver performs a link recovery process. Accordingly, when the handover preparation procedure and the LoS/NLoS transition procedure are compared, the receiver (that is, UE) may check whether LoS/NLoS transmission is capable of being performed using the legacy fallback procedure (that is, handover) before link failure occurs.

Since the handover preparation phase requires about 17.8 ms, if it is determined that a user moves fast in normal circumstances when the motion pattern of the UE corresponds to running at full speed, the time required for the handover preparation phase of the mmWave UE may be reduced to about 10 ms.

Accordingly, the object of the below-described embodiments of the present invention is to reduce the legacy fallback procedure to about 10 ms in FIGS. 11(a) and 11(b) showing the mmWave receive power scenarios.

3. mmWave fallback method

Hereinafter, methods of rapidly transmitting fallback requirements from a receiver to a transmitter before link failure occurs upon LoS/NLos transition of an mmWave system and providing information related thereto in advance will be proposed. In addition, methods of reducing a fallback time are proposed. In addition, for convenience of description, assume that a receiver is an mmWave UE and a transmitter is an mmWave BS.

3.1 Fallback conditions for avoiding link failure

As a first fallback condition for avoiding link failure, in a network environment in which an mmWave BS and a legacy BS overlie, the mmWave BS and the legacy BS may be always RRC-connected to an mmWave UE.

Figure 15:
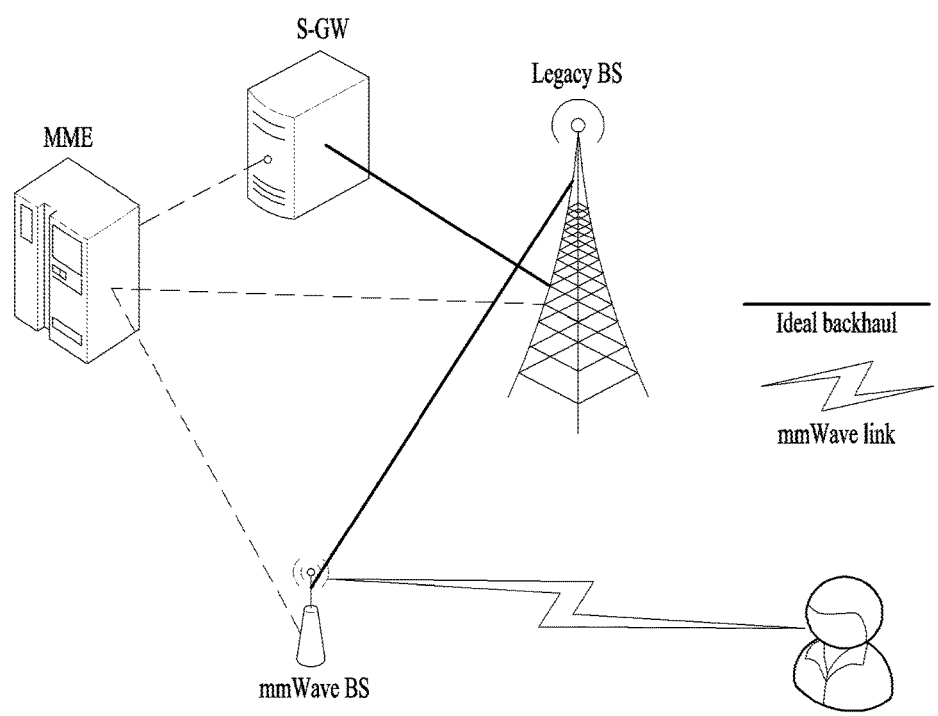
FIG. 15 is a diagram illustrating an initial attachment state for fast fallback with respect to an mmWave UE.

FIG. 15 is a diagram illustrating an initial attachment state for fast fallback with respect to an mmWave UE.

In the embodiments of the present invention, the legacy BS means a cellular BS supported by an LTE/LTE-A system, and the mmWave BS means a BS supporting mmWave operation of a superhigh frequency band. If a cellular BS supports mmWave operation of a superhigh frequency band, the cellular BS may function as an mmWave BS.

Referring to FIG. 15, assume that the legacy BS is connected to a serving gateway (S-GW) and a mobility management entity (MME) through an X2 interface and the legacy BS and the mmWave BS are connected through an Xn interface. In addition, assume that connection between the legacy BS and the S-GW and connection between the legacy BS and the mmWave BS are established through different ideal backhauls. In addition, the mmWave BS and a UE may be connected through an mmWave link.

On the assumption of FIG. 15, if the mmWave BS, the legacy BS and the target UE are RRC-connected, a handover interrupt time may be omitted and a total fallback time may be reduced to 137.8 ms in the handover procedure shown in FIG. 14.

As a second fallback condition for avoiding link failure, upon attaching an mmWave hatnet, a network connection state is S-GW->legacy BS->mmWave BS as the default.

For example, as shown in FIG. 15, when the mmWave UE is initially attached to the network, connection from the S-GW to the legacy BS, connection from the legacy BS to the mmWave BS and connection from the mmWave BS to the mmWave UE are established in this order. In this case, even when the mmWave UE detects LoS/NLoS transition on the mmWave link to perform fallback, the link between the S-GW and the legacy BS is not changed. Accordingly, the handover completion process shown in FIG. 14 may not be considered. Therefore, it is possible to save about 120 ms as compared to the legacy handover process.

Accordingly, if the first condition and the second condition are satisfied, latency of the fallback procedure in FIG. 14 may be reduced from 148.3 ms to 17.8 ms.

As a third fallback condition for avoiding link failure, the mmWave UE performs fallback triggering.

FIG. 16 is a diagram illustrating a method of performing one fallback preparation phase instead of four fallback preparation phases of a legacy system.

FIG. 16(*a*) shows a handover procedure performed as fallback in a legacy BS. At this time, in FIG. 16(*a*), a handover step is performed through four phases and requires about 4 ms, because, when the BS controls handover, the channel measurement result of the UE is delivered to the BS and the UE is notified of whether handover is performed. However, in FIG. 16(*b*), if the mmWave UE decides mmWave fallback, the mmWave UE may transmit only a fallback request to the legacy BS.

Accordingly, due to the third condition, only propagation delay of 1 ms, processing delay of 3 ms and S1 bearer establishment of 7.5 ms are considered, thereby reducing total fallback delay to 11.5 ms. Therefore, the mmWave UE may perform an mmWave fallback procedure for about 10 ms.

3.2 Method of performing fast fallback in order to avoid link failure 3.2.1 Fast fallback proposition step Hereinafter, a fast fallback proposition step will be described.

Figure 17:
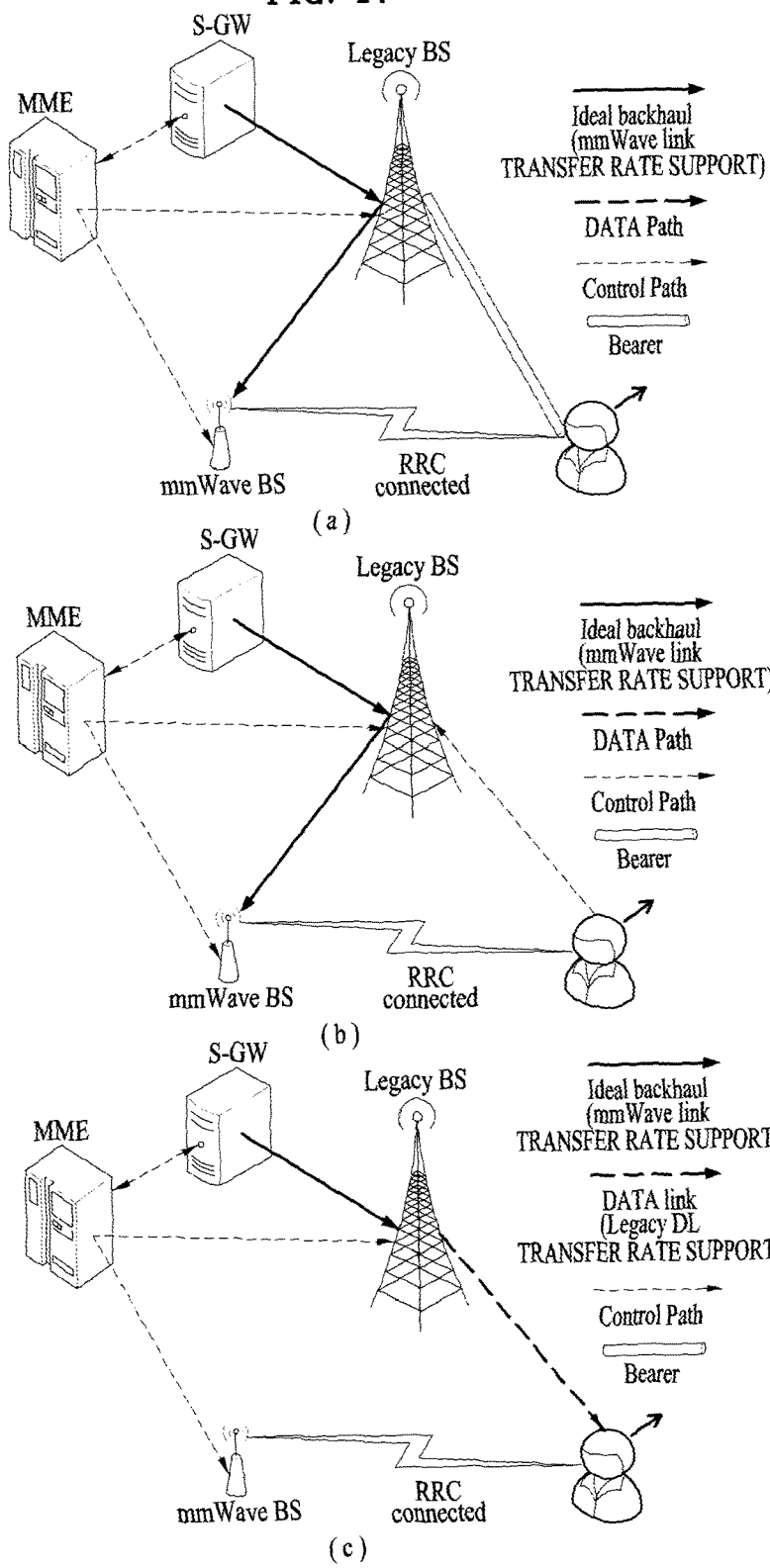
FIG. 17 is a diagram illustrating a method of performing fast fallback in order to avoid link failure.

FIG. 17 is a diagram illustrating a method of performing fast fallback in order to avoid link failure.

FIG. 17(*a*) is a diagram showing preconditions for fast fallback triggering. As the preconditions for fast fallback triggering, assume that a legacy BS, an mmWave BS and an mmWave UE are RRC-connected. In addition, assume that an EMM for non-access stratum (NAS) signaling between the mmWave UE and an MME is registered and an evolved packet system connection management (ECM) connection is established. In addition, assume that an X2 interface is connected through ideal backhaul capable of supporting an mmWave link transfer rate. Hereinafter, EMM registration and ECM connection will be described.

Figure 18:
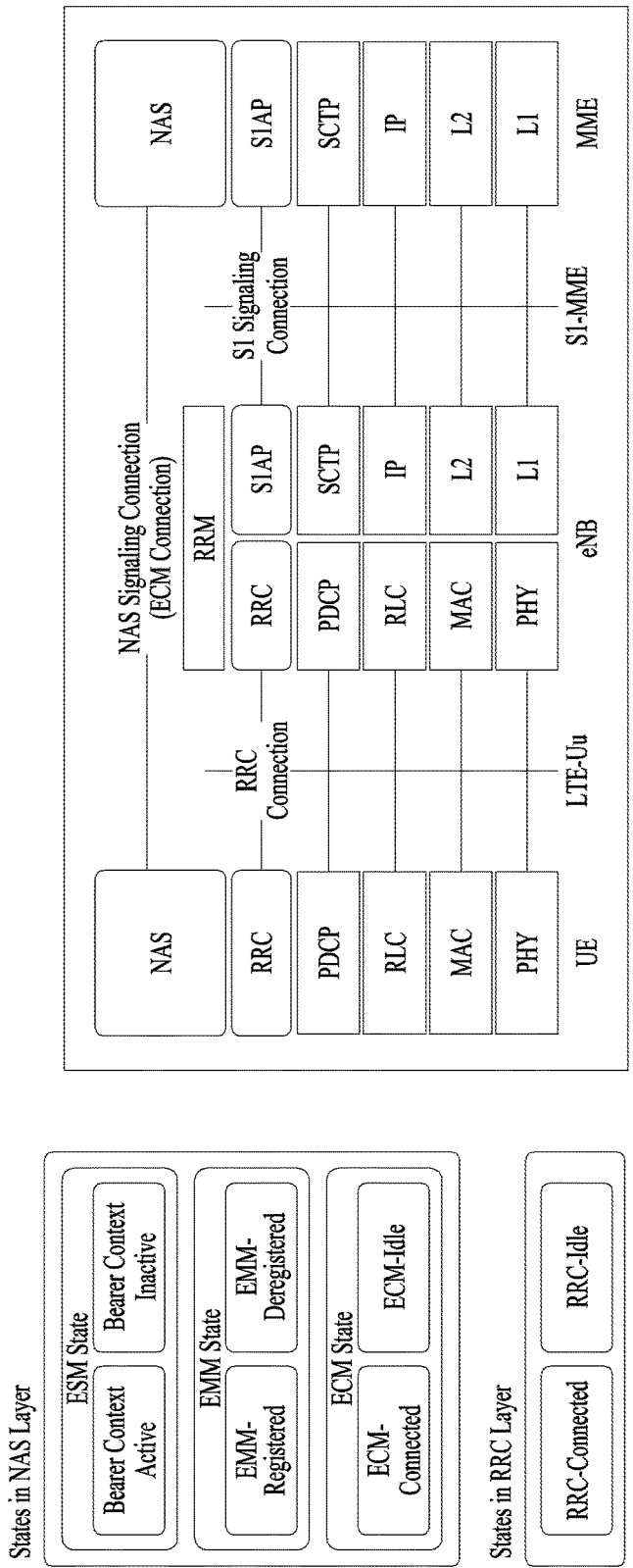
FIG. 18 is a diagram showing an example of a hierarchical configuration illustrating NAS signaling and RRC connection.

FIG. 18 is a diagram showing an example of a hierarchical configuration illustrating NAS signaling and RRC connection.

Referring to FIG. 18, it can be seen that a UE and a BS are RRC-connected and an S1 signaling connection is established between the BS and an MME through S1AP. In addition, assume that an NAS signaling connection (that is, an ECM connection) is established for signaling between the UE and the MME.

The NAS layer is configured in an ESM state for bearer context active/inactive, an EMM state for EMM-registered/deregistered, and an ESM state for ECM-connection/idle. Table 6 below illustrate the connection state of FIG. 17.

TABLE 6

| layer | State | Signaling entity | Description |
|---|---|---|---|
| EMM | EMM-Deregistered | UE, MME | The UE is not attached to the LTE network, and the MME does not know the location information of the UE but knows tracking area information of the UE. |
| | EMM-Registered | UE, MME | The UE is attached to the LTE network, an IP is allocated to the UE, an EPS bearer is initialized, and the MME knows the initial location information of the UE and tracking area information of the UE. |
| ECM | ECM-Idle | UE, MME | A NAS signaling connection is not initialized, and physical resources, i.e., radio resources (SRB/DRB) and network resources (s1 bearer/s1 signaling connection), are not allocated to the UE. |
| | ECM-Connected | UE, MME | The NAS signaling connection is initialized, physical resources i.e., radio resources (SRB/DRB) and network resources (s1 bearer/s1 signaling connection), are allocated to the UE. |
| RRC | RRC-Idle | UE, eNB | RRC initialization is not performed. |
| | RRC-Connected | UE, eNB | The RRC connection is initialized. |

A description will be given with reference to FIG. 17 again.

In addition to the assumptions of FIG. 17(*a*) and the three conditions described in Chapter 3.1, as a fourth fallback condition for avoiding link failure, the legacy BS may transmit, to the mmWave UE, resources to be allocated to the mmWave UE and resource related information using a legacy downlink band in advance.

At this time, the resource related information refers to a message periodically transmitted from the legacy BS to the mmWave UE on downlink prior to transmission of a fallback request message from the UE to the legacy BS.

The resource related information may include an mmWave Temporary BS Cell ID and downlink transmit power strength information of the legacy BS.

The mmWave temporary cell ID refers to a temporary mmWave cell identifier used in consideration of security. Based on the mmWave temporary cell ID, the mmWave UE may identify which mmWave BS is currently connected and which mmWave BS is returned to the LoS link even after mmWave link failure. In addition, the downlink transmit power strength information of the legacy BS is used for the mmWave UE to determine whether a problem does not occur even when the mmWave UE performs fallback. That is, this is information necessary for the mmWave UE to perform fallback to the legacy BS at a desired time.

3.2.2 Fast fallback triggering phase

FIG. 17(*b*) is a diagram illustrating a process of transmitting a fallback request message for triggering fast fallback.

The mmWave UE transmits a fallback request message to the legacy BS on legacy uplink, upon determining that the strength of a downlink transmission signal of the legacy BS is good through the power strength information of the legacy BS and upon determining that the link with the mmWave BS is in an LoS/NLoS transition state.

The fallback request message may include at least one of sequence number (SN) status transfer information for determining which packet is first transferred on legacy downlink, UE-aggregate maximum bit rate (AMBR) information, UE security capability information and access stratum (AS) security base key for the legacy BS.

The SN status transfer information may indicate an SN for a downlink data packet which is not normally received when LoS/NLos transition occurs while the mmWave UE receives data from the mmWave BS on downlink. Accordingly, the legacy BS, which has received SN status transfer information, may first transmit the downlink data packet indicated by the SN status transfer information to the mmWave UE.

The UE-AMBR information means a maximum transfer rate required for the UE in consideration of QoS. Accordingly, the UE-AMBR information may be set to an appropriate value in consideration of a large difference in transmission amount between the mmWave link and the legacy link.

The UE security capability information refers to information indicating a security algorithm allowed by the mmWave UE.

In addition, the legacy BS may encrypt signaling information, data packets, etc. to be transmitted from the legacy BS to the mmWave UE based on the AS security base key information transmitted by the mmWave UE.

3.2.3 Fast fallback triggering phase

FIG. 17(c) is a diagram illustrating a method of, at an mmWave UE, performing fast fallback upon detecting LoS/NLoS transition.

As a fifth fallback condition for avoiding link failure, an mmWave BS and an mmWave UE may be configured to be maintained in an RRC connection state even after fallback. That is, even after fallback to the legacy BS, the mmWave BS and the mmWave UE may be in the RRC connection state to determine when the mmWave UE releases fallback. Accordingly, the mmWave BS may transmit a reference signal for LoS/NLoS transition to the UE on mmWave downlink even after fallback.

Figure 19:
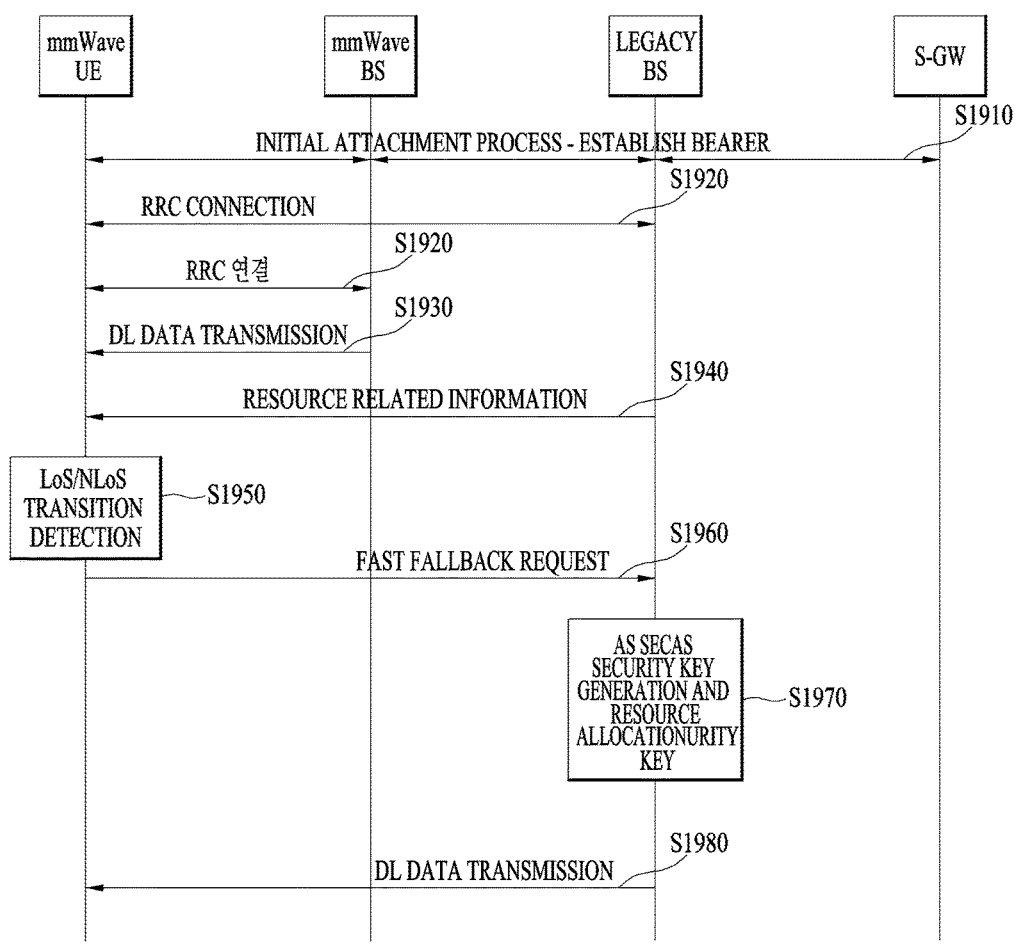
FIG. 19 is a diagram illustrating a method of performing fast fallback.

FIG. 19 is a diagram illustrating a method of performing fast fallback.

The below-described fast fallback method may be performed under the above-described preconditions. In addition, although not described with reference to FIG. 19, for details necessary to perform fast fallback of FIG. 19, refer to Chapters 1 to 3.

For example, an initial attachment process from an S-GW to a legacy BS, from the legacy BS to an mmWave BS and from the mmWave BS to an mmWave UE is performed in this order, and a radio bearer may be established between entities. (S1910).

In addition, assume that an RRC connection process is performed between the mmWave UE and the legacy BS and between the mmWave UE and the mmWave BS and the connection is continuously maintained (S1920).

The mmWave BS may transmit DL data through an mmWave link based on the RRC connection established with the mmWave UE (S1930).

The legacy BS may transmit, to the mmWave UE, resource related information of resources to be allocated to the mmWave UE periodically, in a semi-static manner or in an event trigger manner, if fallback is performed later (S1940).

The resource related information of step S1940 may include an mmWave temporary cell ID and downlink transmit power strength information of the legacy UE (see Chapter 3.2.1). In addition, the resource related information may further include resource allocation information of legacy uplink resources used to transmit a fast fallback request message upon performing fallback.

The mmWave UE may detect LoS/NLoS transition while performing communication with the mmWave BS. For the method of detecting whether NLoS transition occurs, refer to Chapter 2 (S1950).

When NLoS transition occurs, the mmWave UE may determine whether to perform fallback to the legacy BS based on the resource related information received in step S1940. For example, the mmWave UE may determine whether fallback to the legacy BS is suitable based on the transmit power strength information. When it is determined that fallback is suitable, the mmWave UE may transmit a fallback request message using the mmWave temporary cell ID through a legacy uplink resource region indicated by resource allocation information.

The legacy BS may establish a predetermined bearer or a new bearer with an S-GW upon receiving a fast fallback request from the UE and provide a service to the UE. In addition, the legacy BS may generate an AS security key for transmitting data to the UE after fallback and allocate a resource region for transmitting downlink data to the UE (S1970).

The BS may transmit the AS security key generated in step S1970 and the resource allocation information to the UE and transmit DL data through the allocated resource region (S1980).

4. Apparatuses

Figure 20:
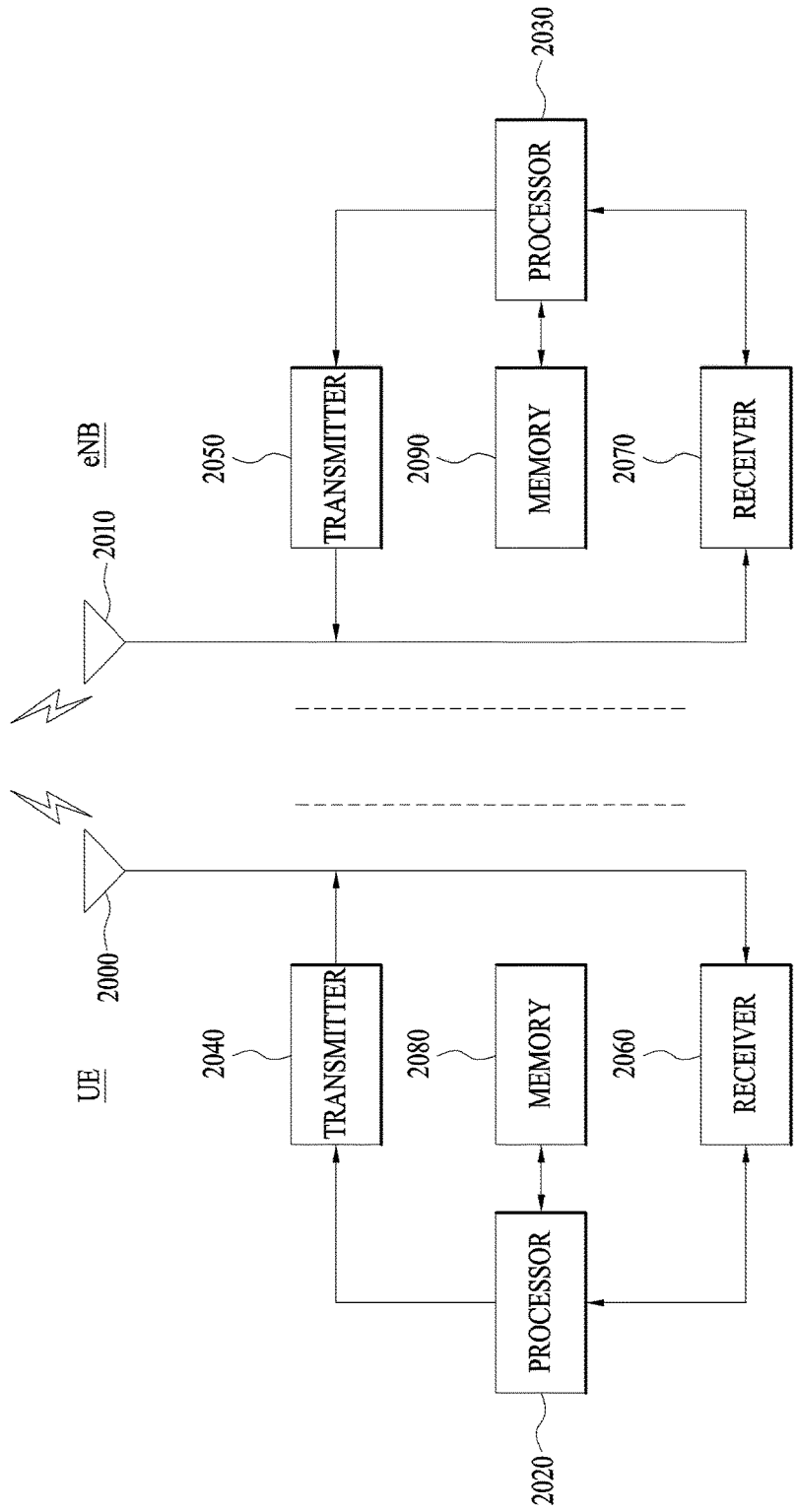
FIG. 20 is a diagram showing an apparatus for implementing the methods described with reference to FIGS. 1 to 19.

Apparatuses illustrated in FIG. 20 are means that can implement the methods described before with reference to FIGS. 1 to 19.

A UE may act as a transmission end on a UL and as a reception end on a DL. An eNB may act as a reception end on a UL and as a transmission end on a DL.

That is, each of the UE and the eNB may include a Transmitter (Tx) 2040 or 2050 and a Receiver (Rx) 2060 or 2070, for controlling transmission and reception of information, data, and/or messages, and an antenna 2000 or 2010 for transmitting and receiving information, data, and/or messages.

Each of the UE and the eNB may further include a processor 2020 or 2030 for implementing the afore-described embodiments of the present disclosure and a memory 2080 or 2090 for temporarily or permanently storing operations of the processor 2020 or 2030.

The transmitter and the receiver of the UE and the eNB may perform a packet modulation/demodulation function for data transmission, a high-speed packet channel coding function, OFDMA packet scheduling, TDD packet scheduling, and/or channelization. Each of the UE and the eNB of FIG. 20 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 2080 or 2090 and executed by the processor 2020 or 2030. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

The invention claimed is:

1. A method of performing a fast fallback at a user equipment (UE) in a wireless access system supporting millimeter wave (mmWave), the method performed by the UE and comprising:
    establishing radio resource control (RRC) connections with each of an mmWave base station (BS) and a legacy BS;
    receiving downlink data from the mmWave BS;
    receiving, from the legacy BS, information related to resources to be allocated for the fast fallback, wherein the information is received periodically and includes downlink transmit power strength information of the legacy BS;
    detecting whether non-line of sight (NLoS) transition occurs in an mmWave link with the mmWave BS;
    determining whether to transmit a fallback request message based on the downlink transmission power strength information of the legacy BS in order to perform a fast fallback to the legacy BS in response to the NLoS transition being detected; and
    receiving downlink data from the legacy BS after the fallback request message is transmitted and the fast fallback to the legacy BS is performed,
    wherein the UE maintains the RRC connection with the mmWave BS after performing the fast fallback to the legacy BS.

2. The method according to claim 1, wherein the information includes a temporary cell identifier.

3. The method according to claim 2, wherein the information further includes resource allocation information for allocating a resource region in which the fallback request message is transmitted.

4. The method according to claim 1, wherein the fallback request message includes sequence number (SN) status transfer information, UE-aggregate maximum bit rate (AMBR) information, UE security capability information and an access stratum (AS) security base key for the legacy BS.

5. A user equipment (UE) for performing fast fallback in a wireless access system supporting millimeter wave (mmWave), the UE comprising:
    a transmitter;
    a receiver; and
    a processor that controls the transmitter and the receiver to support fast fallback,
    wherein the processor:
    controls the transmitter and the receiver to establish radio resource control (RRC) connections with each of an mmWave base station (BS) and a legacy BS,
    controls the receiver to receive downlink data from the mmWave BS,
    controls the receiver to receive, from the legacy BS, information related to resources to be allocated for the fast fallback, wherein the information is received periodically and includes downlink transmit power strength information of the legacy BS,
    detects whether non-line of sight (NLoS) transition occurs in an mmWave link with the mmWave BS,
    determines whether to transmit a fallback request message based on the downlink transmission power strength information of the legacy BS in order to perform a fast fallback to the legacy BS in response to the NLoS transition being detected, and
    controls the receiver to receive downlink data from the legacy BS after the fallback request message is transmitted and the fast fallback to the legacy BS is performed,
    wherein the UE maintains the RRC connection with the mmWave BS after performing the fast fallback to the legacy BS.

6. The UE according to claim 5, wherein the information includes a temporary cell identifier and downlink transmit power strength information of the legacy BS.

7. The UE according to claim 6, wherein the information further includes resource allocation information for allocating a resource region in which the fallback request message is transmitted.

8. The UE according to claim 5, wherein the fallback request message includes sequence number (SN) status transfer information, UE-aggregate maximum bit rate (AMBR) information, UE security capability information and access stratum (AS) security base key for the legacy BS.

* * * * *